United States Patent
Shoshan

(10) Patent No.: US 8,527,521 B2
(45) Date of Patent: Sep. 3, 2013

(54) SYSTEM AND METHOD FOR EVALUATING THE QUALITY OF HUMAN TRANSLATION THROUGH THE USE OF A GROUP OF HUMAN REVIEWERS

(75) Inventor: Ofer Shoshan, Zefat (IL)

(73) Assignee: One Hour Translation, Inc., Nicosia (CY)

( * ) Notice: Subject to any disclaimer, the term of this patent is extended or adjusted under 35 U.S.C. 154(b) by 154 days.

(21) Appl. No.: 13/093,047

(22) Filed: Apr. 25, 2011

(65) Prior Publication Data

US 2011/0307495 A1    Dec. 15, 2011

Related U.S. Application Data

(60) Provisional application No. 61/352,897, filed on Jun. 9, 2010.

(51) Int. Cl.
*G06F 7/00* (2006.01)
*G06F 17/30* (2006.01)

(52) U.S. Cl.
USPC .......................................................... 707/748

(58) Field of Classification Search
USPC .......................................................... 707/748
See application file for complete search history.

(56) References Cited

U.S. PATENT DOCUMENTS

| | | | |
|---|---|---|---|
| 6,278,967 B1 * | 8/2001 | Akers et al. ..................... | 704/2 |
| 6,760,695 B1 * | 7/2004 | Kuno et al. ...................... | 704/9 |
| 8,185,375 B1 * | 5/2012 | Kumar et al. .................... | 704/4 |
| 8,326,598 B1 * | 12/2012 | Macherey et al. ................ | 704/4 |
| 2002/0198699 A1 * | 12/2002 | Greene et al. .................... | 704/2 |
| 2007/0219774 A1 * | 9/2007 | Quirk et al. ...................... | 704/2 |
| 2008/0195372 A1 * | 8/2008 | Chin et al. ....................... | 704/2 |
| 2009/0157386 A1 * | 6/2009 | Zhou ............................... | 704/9 |
| 2009/0198487 A1 * | 8/2009 | Wong et al. ..................... | 704/4 |
| 2011/0077935 A1 * | 3/2011 | Viswanadha et al. ........... | 704/7 |
| 2012/0330643 A1 * | 12/2012 | Frei et al. ........................ | 704/2 |

\* cited by examiner

*Primary Examiner* — Hung T Vy
*Assistant Examiner* — Merilyn Nguyen
(74) *Attorney, Agent, or Firm* — Carrie M. Stroup

(57) ABSTRACT

System and computer implemented method for evaluating the quality and accuracy of a human translation from a source language to a target language by a group of professional translation reviewers communicating in real-time. The system and method comprise a system computer with a database of profiles and credentials of reviewers; and the ability to communicate with groups of selected reviewers via a computer network. The computer system assigns evaluations and collects ratings returned by reviewers, and calculates a consensus rating for the group, while omitting statistical outliers. The system will also calculate a score for the reviewer as compared to the group, and use the score in selecting reviewers for future evaluations.

19 Claims, 9 Drawing Sheets

SYSTEM AND METHOD FOR EVALUATING THE QUALITY OF HUMAN TRANSLATION THROUGH THE USE OF A GROUP OF HUMAN REVIEWERS

PRIORITY CLAIMS TO RELATED PROVISIONAL APPLICATIONS

The present application claims priority benefit to U.S. Provisional Patent Applications Ser. No. 61/352,897, filed Jun. 9, 2010 by Ofer Shoshan, entitled "System and Method for Evaluating the Quality of Human Translation Through the Use of a Group of Human Reviewers", the disclosure of which is incorporated by reference.

FIELD OF INVENTION

The invention relates to the field of improving human translation. More specifically the invention relates to the field of evaluating the quality of human translation using a network of other human translators and computer formulas to rate a translation in a quick, accurate and efficient way.

BACKGROUND OF INVENTION

In today's global economy quality translation from one language to another language of text becomes more and more important. While there are many machine, computer based, translation systems, such as Google Translate, professional human translators are still required in order to produce accurate, high-quality, translation. Unfortunately, human translators often err and produce inadequate translation. The common solution today is to have proofreader or editor read the translated text and correct it as needed. This solution is expensive, slow and inadequate.

Language translation is also a complicated process due to a variety of factors, such as syntax, semantics, and language ambiguity that occurs in various aspects in natural language processing, i.e. lexical ambiguity, case ambiguity and referential ambiguity. Therefore, to maintain a high standard of translation, a translator must translate into a language they are fluent in both written and oral form, and they must also have a sufficient knowledge of the field being translated to have a full understanding of the subject matter. It is no wonder then that translations by professional translators can often be of variable quality; and why machine translations are often riddled with errors.

Bad translation can cause a lot of damage; sometimes even a single word can drastically change the meaning of the entire paragraph. Machine translation solutions are not accurate enough and the existing methods for evaluating translation quality are cumbersome, slow and expensive. Usually a supervising proofreader checks the translation and corrects it if errors are found. A single proofreader may not locate all the errors in the translation especially if s/he is under time pressure.

The quality level of a given translation is hard to determine as it is a very subjective matter. In essence, a translation is considered to be good if enough people with control of both the source language and the target language consider it to be an accurate and succinct translation. But, with the existing methods, submitting a project for proofreading or review by more than one proofreader will result is unacceptable costs in terms of time and money.

Therefore, there is a need within the art of language translations for an efficient, economical, reliable, and timely method of evaluating the quality and accuracy of the translation simultaneously by a group of professional translators.

The invention is based on a novel system and computer implemented method comprising the use of many translator reviewers connected in real-time by a computer network (like the Internet) to review the translation and give their rating on the quality and accuracy in parallel. The total rating for the translation is calculated in a novel way.

SUMMARY OF THE INVENTION

The present invention comprises an efficient and economical system and a computer implemented method for evaluating the quality of a translation of text from the original source language to a target language. A completed translation project is presented to qualified translator reviewers (herein known as "reviewers") based on their characteristics, such as native language, skills and education, previous experience and history of rating translations. The translator reviewers' data is taken from the computer system database. The requests are sent to the reviewers using a computer network like the Internet. Each reviewer views the source text and the translated text and then rates the translation on a 1 to 10 scale, while also being able to provide textual comments. Ratings are collected from several reviewers (typically minimum of 5 to maximum of 10). Ratings are adjusted to exclude outliers by use of mathematical formulas, such as removing ratings more than one standard deviation beyond the group mean or average. After cleaning the individual reviewers' ratings, the new average rating is produced. A low average rating provokes an action such as retranslation of the project. Reviewers are given a score based on how close they are to the general average to encourage providing a true rating and to exclude outliers from providing future rating.

The novelty in the invention is to use crowdsourcing by harnessing a large group of preselected qualified reviewers over a computer network in order to get their rating of quality, accuracy, and conciseness of a translation in a quick and efficient way. Collecting many ratings quickly and performing the right calculation enables producing accurate consensus rating for a translation in a way that was never done before.

The present invention is to be able to determine the quality of a given human translation by efficiently collecting ratings that qualified translator reviewers gave the translation; and by performing calculations on these ratings in order to produce one quality consensus rating for the translation.

Another aspect of the present invention is to select the most suitable individual translator reviewers based on their profile stored within the computer system database, and to contact them electronically.

Another aspect is to collect their individual rating at different times from different places around the world over the Internet.

Another aspect is to calculate a reliable consensus rating based on individual rating and on additional calculations.

Another aspect is to produce the above consensus rating in a short amount of time and at a low cost.

Another aspect is to rate each translator reviewer based on the rating they gave as compared to the consensus rating to produce more reliable ratings in the future.

BRIEF DESCRIPTION OF THE DRAWINGS

The invention and its different aspects and advantages will be better understood from the following detailed description of preferred embodiments of the invention with reference to the following drawing.

DETAILED DESCRIPTION OF THE INVENTION

Figure 1:
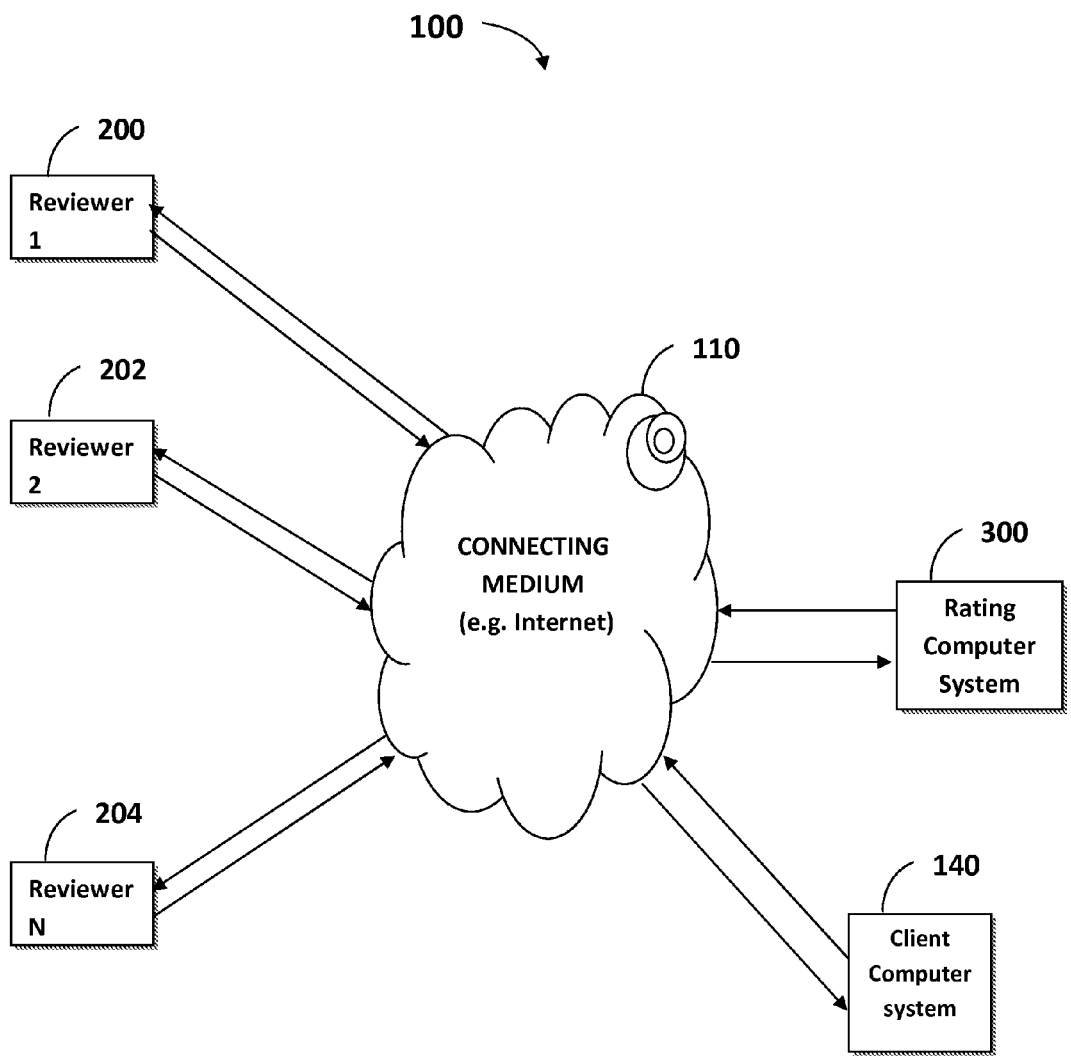
FIG. 1 is a block diagram representing the computer network embodying the Invention.

The present invention comprises a system and computer implemented method to evaluate the quality and accuracy of a language translation of text using a computer network of translator reviewers communicating in real-time. FIG. 1 is a block diagram representation of a connection medium—"network" (such as a computer network or the Internet) 100 embodying one preferred embodiment of the present invention. The system has one computer system 300 running a preferred embodiment of the present invention, and one or more computer systems of translator reviewers 200, 202, 204 etc . . . (herein known as "Reviewers") connected to the said computer system 300 via a network 110; as well as connecting computer system 300 to a customer computer system 140 via the said network 110.

A novel process running on the computer network 100 comprises sending the translation for review from the computer system 300 to the computer systems of the reviewers 200, 202, etc. over the network 110 and collecting the rating they send back over the network. The computer system 300 performs novel calculations (described in the following sections) to compute a Consensus rating which is presented to the customer via the customer computer system 140. The computer system 300 then performs novel reviewer score calculations, which are sent to the reviewers' computer systems (200, 202, etc.) over the network 110.

The results of the operation of the novel process described above is a fast and efficient collection of ratings from selected translator reviewer in parallel; a novel calculation of consensus rating for the translation; and a novel calculation of the translator reviewers' scores that are subsequently used in the future selection of translator reviewers.

Figure 2:
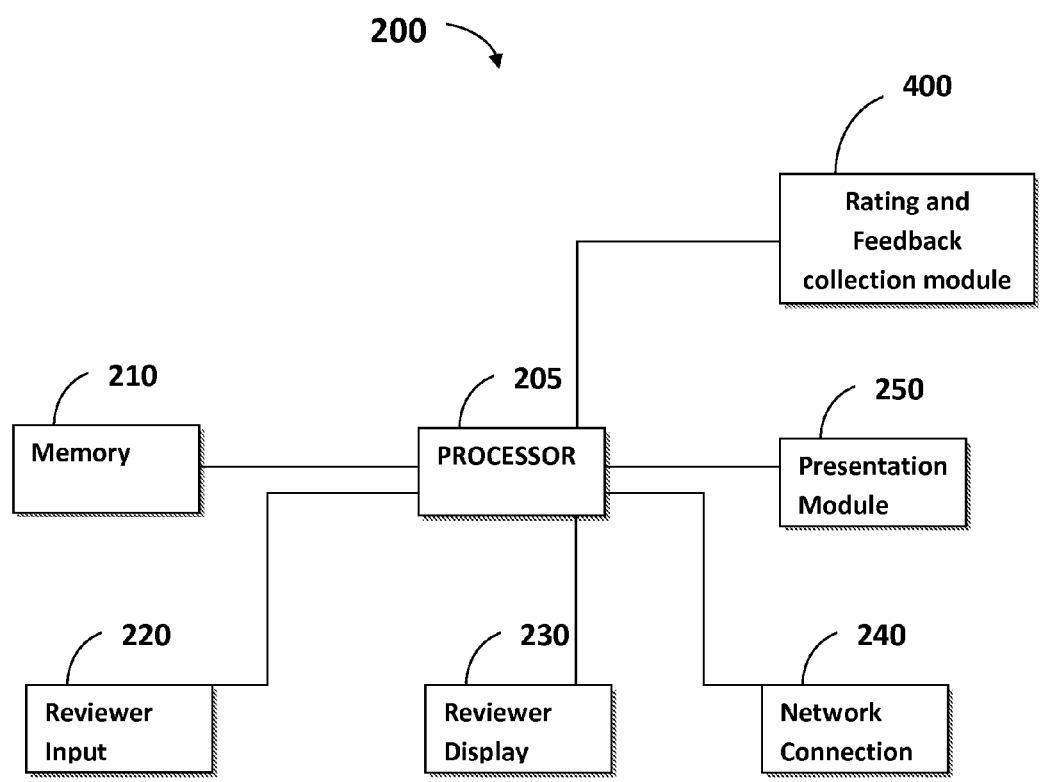
FIG. 2 is a block diagram representing the computer system of a reviewer that checks the translation project and provides a rating of the quality of the translation.

FIG. 2 is a block diagram representation of a computer system 200 running a preferred embodiment of the invention, the translator reviewer interface used to receive the alert from the central computer system 300 and present it to the reviewer and then receive the rating from the reviewer and send it to the central system 300. The computer system 200 has one or more processing units (CPUs) 205, one or more memories 210, user input devices—Keyboard & mouse—220, user display 230, and network connection 240 e.g. any laptop or desktop PC. The computer system 200 is running a rating feedback alert and collection module 400, which is used to alert the reviewer in real-time that s/he has a new project to review and to collect the rating from the translator reviewer after their evaluation is completed. The reviewers system 200 further comprises a Presentation module 250, that displays to the reviewer show the translated project that needs to be evaluated and rated in a convenient way (source and translation side-by-side) and to present the translator reviewer score when it is received from the central system 300.

Figure 3:
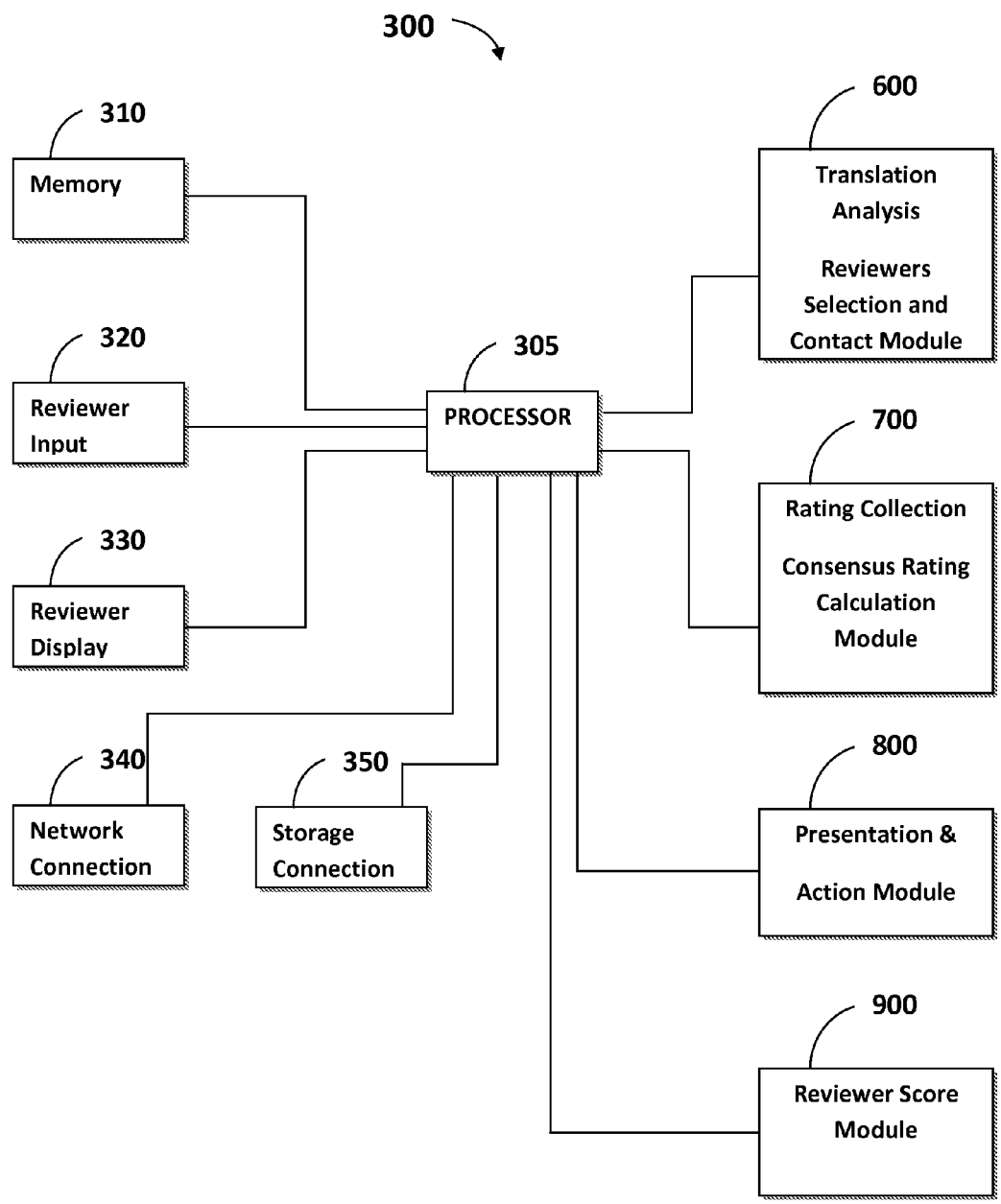
FIG. 3 is a block diagram representing the computer system embodying the Invention.

FIG. 3 is a block diagram representation of a computer system 300 that is running one preferred embodiment of the invention, the main processing modules for selecting the right translators, contacting them, collecting their ratings, calculating consensus rating sending it to the customer computer system and calculating a score for each translator. The computer system 300 has one or more processing units (CPUs) 305, one or more memories 310, user input devices—Keyboard & mouse—320, user display 330, Network connection 340, and storage connection 350. e.g. any server computer. The computer system 300 is running the Translator for Rating analysis and Translator select and contact module 600. This module is used to find and select the right translators to perform the Review and contact them via the network 110. It uses novel approach to locate and contact many relevant translators at once. It further contains the Rating collection and Consensus rating calculation module 700. This module is used to collect ratings from individual translators and then calculate consensus rating in a novel way. Computer system 300 further contains the Presentation and Action module 800. As shown in FIG. 1, this module is used to send the results to the customer computer system 140 over the network 110 and take predefined action if the consensus rating is too low. The computer system 300 further contains the Translator Reviewer Score module 900. This module is used to calculate a score for the reviewer in a novel way and send the score to the reviewer. The score is subsequently used when reviewers are selected to evaluate and rate the quality future translation projects.

Figure 4:
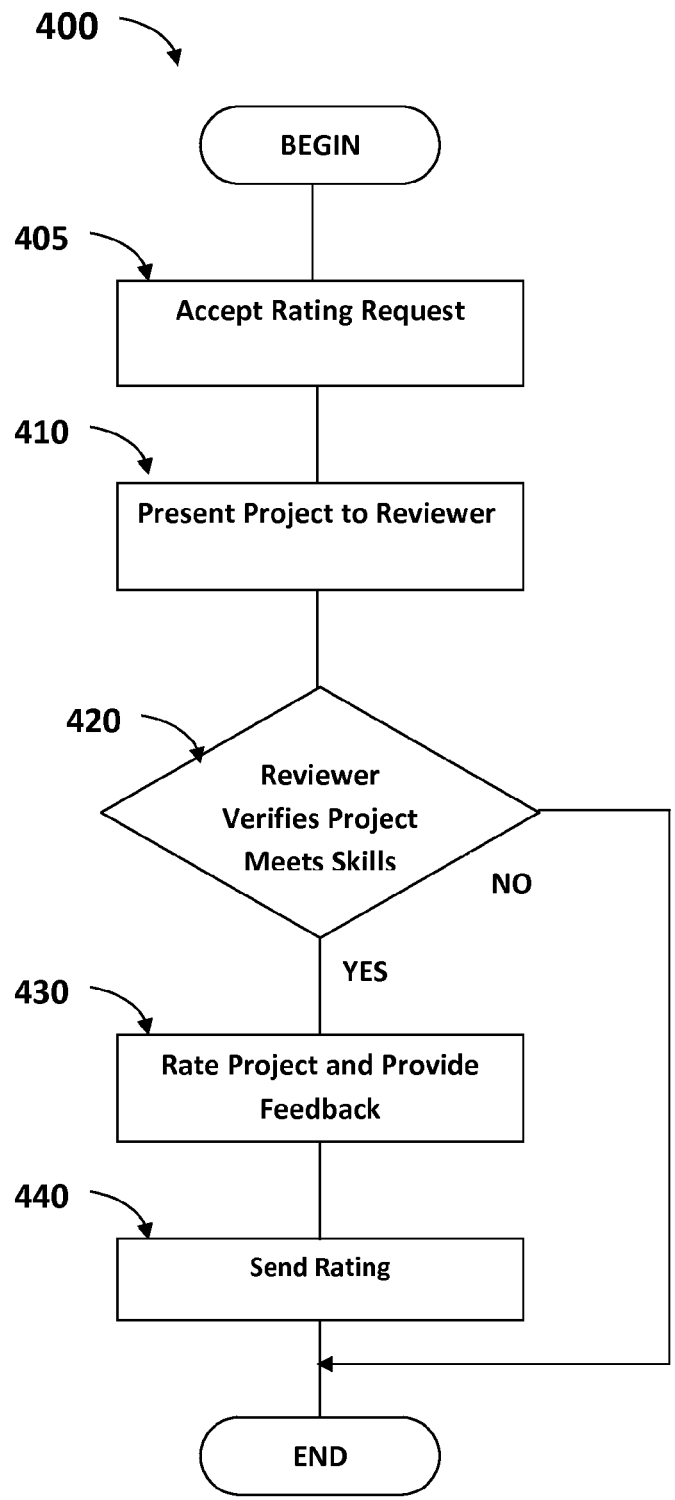
FIG. 4 is a logic flow and functional block diagram illustrating typical structure and data flow of rating alerts and collection module presented in FIG. 2.

FIG. 4 is a flow diagram representation of the sequential operations 400 in the computer system 200, FIG. 2 of the reviewer. A reviewer gets an alert that a new translation project is available via electronic communications means, such as email, mobile text message, or a reviewers web page. The reviewer then opens the rating request 405 and accepts it. The project with the original and the translated text/files is presented to the reviewer 410 on his computer system using display 230. The reviewer then decides if the project meets his/her skills or not. If it does, then the reviewer evaluates the translation project 430 for designated parameters, such as accuracy and conciseness, and provides feedback and rating on a scale of 1 (low rate) to 10 (high rate). As shown in FIGS. 1 and 4, the rating and the textual feedback 440 are sent to computer system 300 from computer system 200 and over the computer network 110. Computer system 300 processes the rating as described in FIG. 5 and FIG. 7.

Figure 5:
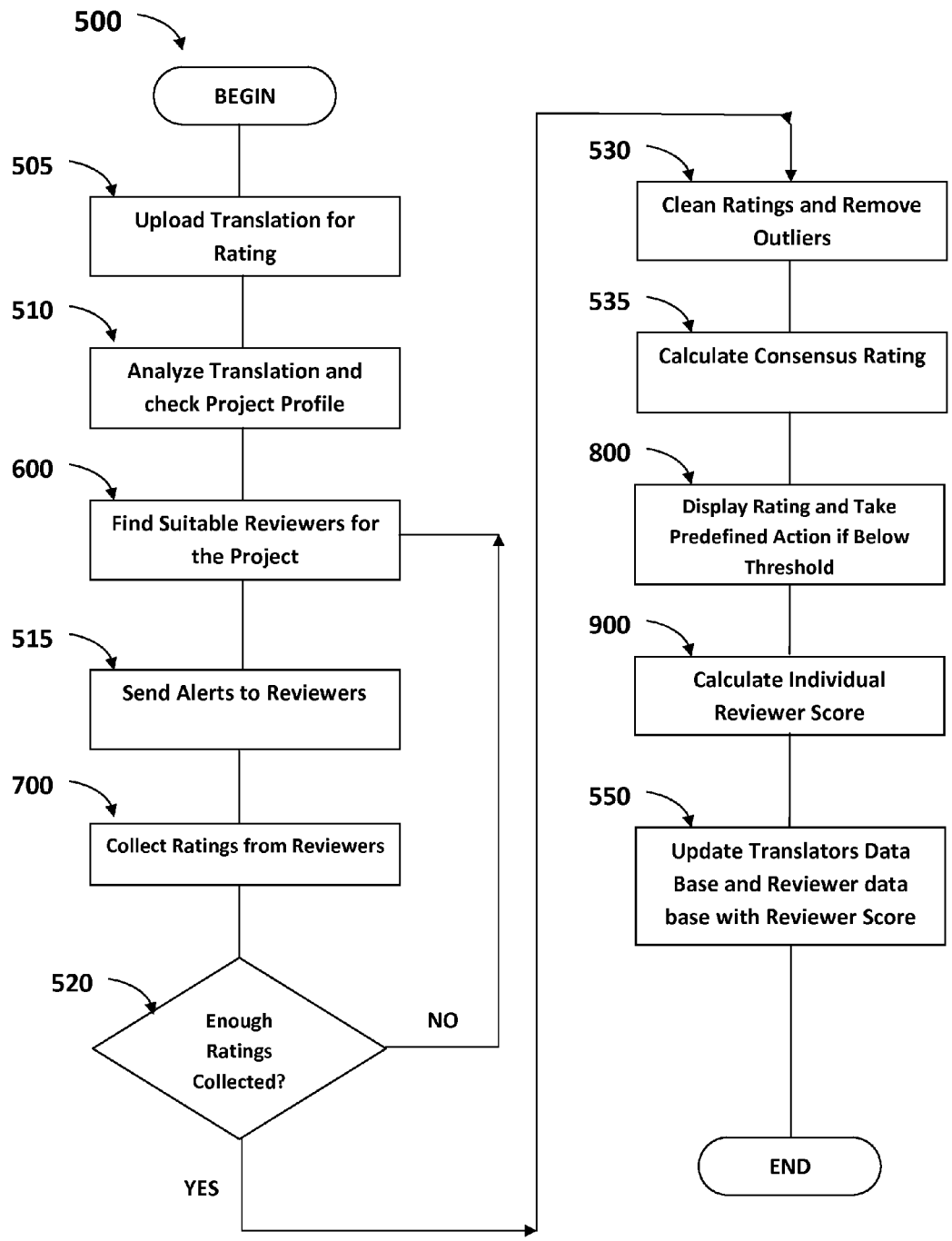
FIG. 5 is a flow diagram illustrating sequential operation of the present Invention in the computer system presented in FIG. 3 comprising applying Translation analysis, Reviewers selection, Reviewers alert, Rating collection, Consensus rating calculation, Action module, and Reviewer Score module.

FIG. 5 is a flow diagram illustrating the sequential operations 500 in computer system 300 of FIG. 3 once a translation project is sent from the client computer 140 to the rating computer systems 300 (See FIG. 1). First the project is analyzed 510 to collect project characteristics, such as source language, target language, type of translation, length, files types etc. The computer system 300 creates a project profile based on the collected project characteristics. Then process 600 is used in order to select the potential translator reviewers to perform the evaluations. Reviewers are selected based on the project profile of characteristics and on their individual profile stored in the translator reviewers' data-base connected to or stored on the computer system 300. An individual reviewer profile may comprise reviewer's areas of expertise, preferences for types of projects, availability, etc . . . Each potential reviewer is alerted 515 of the new translation project by use of electronic communication, for example, email, mobile text message, web-page, Instant messenger and potentially other communication means. Computer system 300 sends the alerts in groups of 10 reviewers and checks 520 if enough reviewers have evaluated and rated the translation project already. If the number of reviewers who did the evaluation is lower than the designated minimum number of reviewers (i.e., of 10), then the message is sent to the next group of 10 reviewers. Once there are enough reviewers' rating collected from each reviewer via his computer system 200, 202 etc. and the network 110 using the rating collection module 700, then the ratings from the different reviewers are processed 530 in order to clean and remove outliers, and to produce a Consensus Rating 535. The Consensus Rating is displayed using module 800 and compared to a predefined "quality threshold", which is defined as the minimal rating above which a translator is allowed to work on translation projects. It is thus the minimal Consensus Rating considered acceptable as a valid indication of the quality of a translation. A Consensus Rating falling below the quality threshold indicates a significant amount of errors in the original translation. If the Consensus Rating is below the predefined quality threshold, then a predefined action 820 is invoked in module 800 to correct the situation, such as automatically ordering a new translation of the project from a different translator; and the subsequent evaluation of the quality of the new translation by a plurality of reviewers. After the Consensus Rating is presented or acted upon, then module 900 is invoked to calculate the Reviewer score based on the rating the other Reviewers gave. The process continues to update the database connected to the computer system 300 via connection 350 with the Consensus Rating and Reviewer Score for use with future reviews and other procedures. In particular, both the translators' database and the reviewers' database is updated with the Reviewer score as illustrated in FIG. 5, 550.

Figure 6:
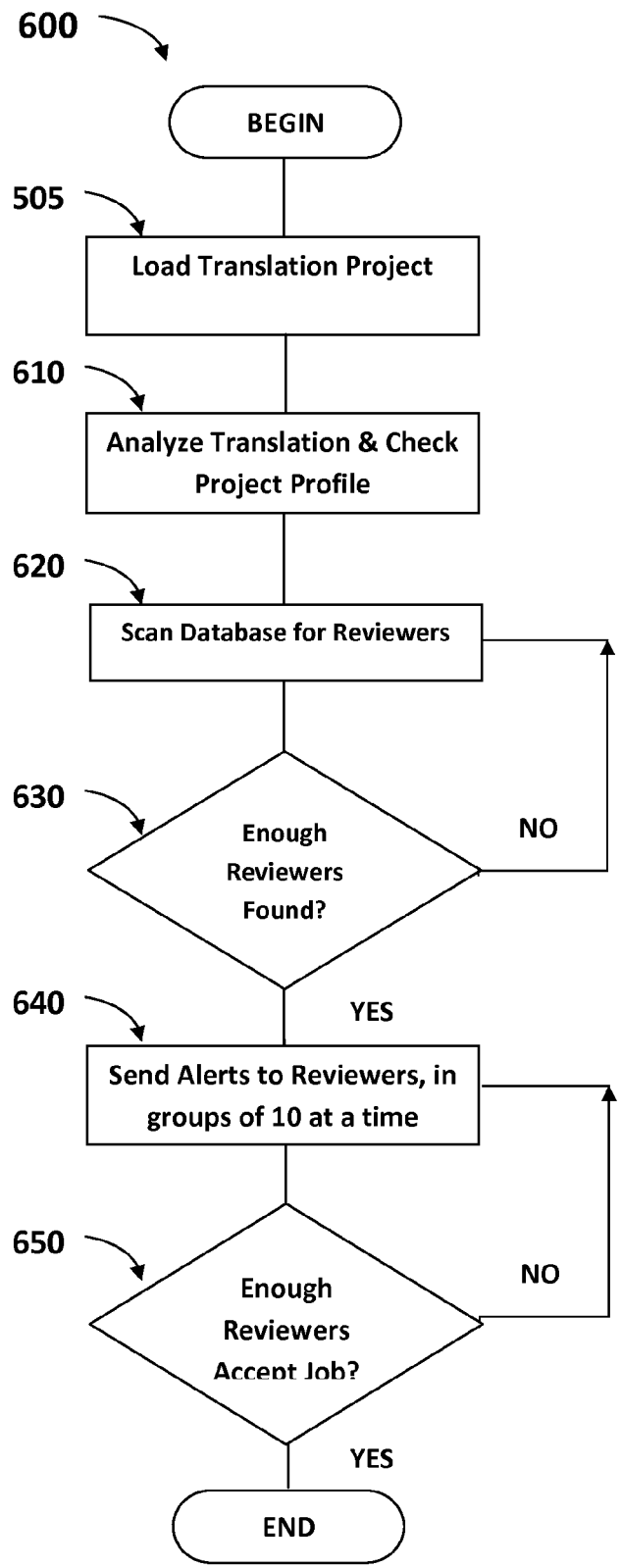
FIG. 6 is a flow diagram representing the Translation Analysis and Reviewers select module presented in FIG. 3, 600.

FIG. 6 is a flow diagram illustrating the sequential operations 600 in computer system 300 representing the Translation Analysis and Reviewers Selection and Contact Module, FIG. 3, 600. Translation project is sent to computer system 300 for review, and the project is loaded 505. The project profile of characteristics produced in process 510, FIG. 5, is analyzed 610. Based on the project characteristics the computer system database storing the reviewers' profile is scanned in process 620 to find appropriate reviewers to perform the evaluation. A reviewer is selected if his/her skills meet the project meta-data requirements, e.g. source language and target language, and other parameters like previous Reviewer score. If there are Not enough reviewers (the designated number of minimal number of reviewers for a particular project is not reached) 630, then the process 620 continues until enough reviewers are found. An alert is sent to the first 10 Reviewers by process 640 via various electronic communications means, such as email, mobile text message, web page etc. Replies are monitored 650 and if there are not enough replies the computer system 300 goes back to process 640 in order to send the alert to the next group of 10 reviewers.

Figure 7:
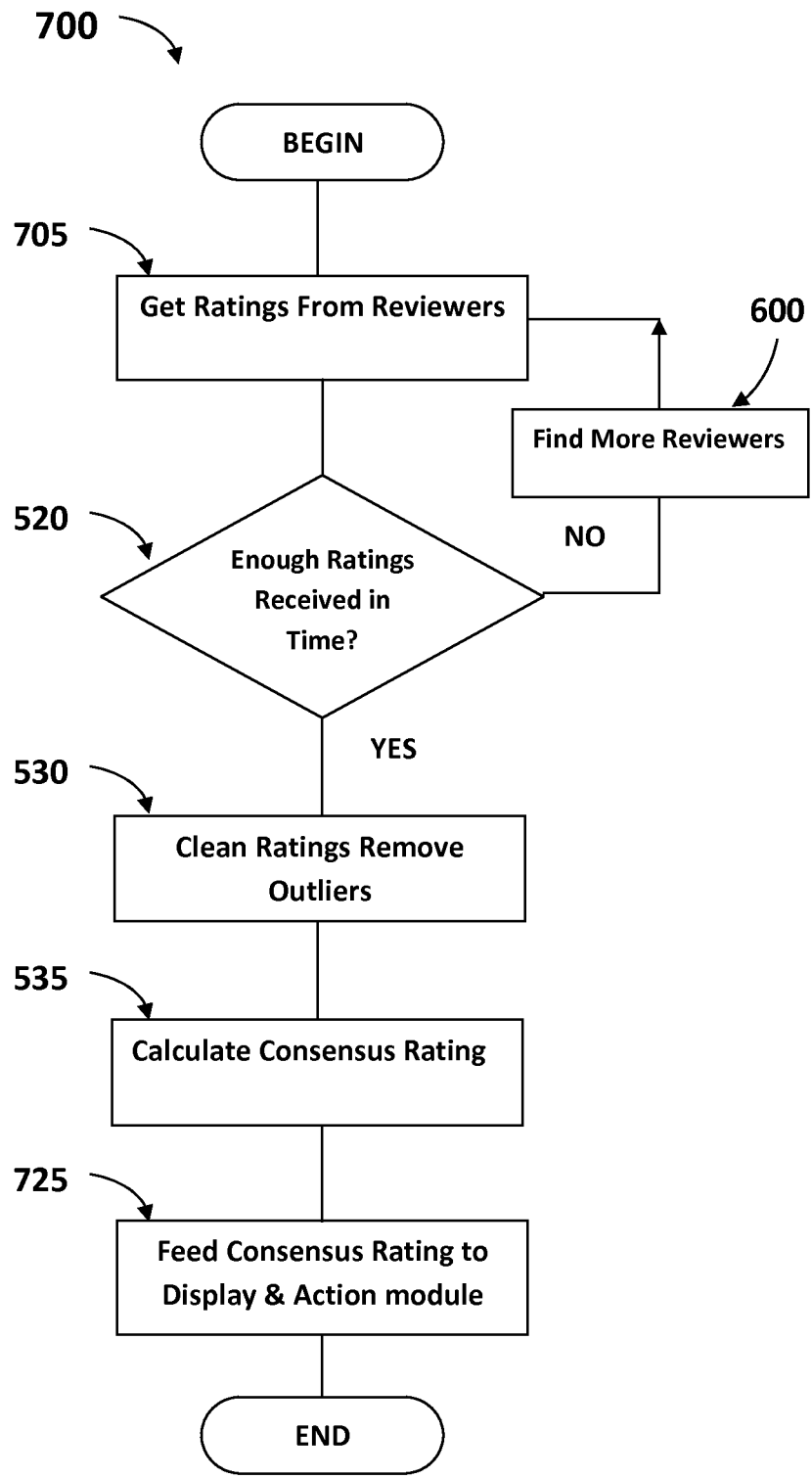
FIG. 7 is a flow diagram representing the Rating Collection Model and the Consensus Rate Calculation module in FIG. 3, 700.

FIG. 7 is a flow diagram illustrating the sequential operations 700 in computer system 300 representing the Rating Collection Model and the Consensus Rating Calculation module. In process 705 the system is collecting the ratings that arrive from the Reviewers (translators doing the review).

As shown in FIGS. 1 through 3, each rating is received from the reviewer computer system 200 via the network connection to computer system 300. The process 520 checks if there are enough reviewers' ratings (according to present designated minimal number of reviewers for a particular project). Once there are enough ratings, then process 530 is invoked to clear the ratings and remove outliers. Then the processed ratings are fed to process 535 which calculates the Consensus Rating for the project. The Consensus Rating is then sent by process 725 to the Action Module 800. As shown in item 520, FIG. 7, if not enough ratings are collected, the system will notify reviewers that their ratings are due 705, and/or the system will search for new reviewers 600 (See also FIGS. 5, 520 & 600). Computer system 300 further deals with situations where there are not enough ratings collected in a preset amount of time and continues using the rating it collected when the time is up (even if the number of collected ratings did not reach the defined threshold). If there is a time limitation reached, and still not enough reviewers have returned their ratings, the system will simply save each individual Reviewer rating without calculating the Consensus Rating.

Figure 8:
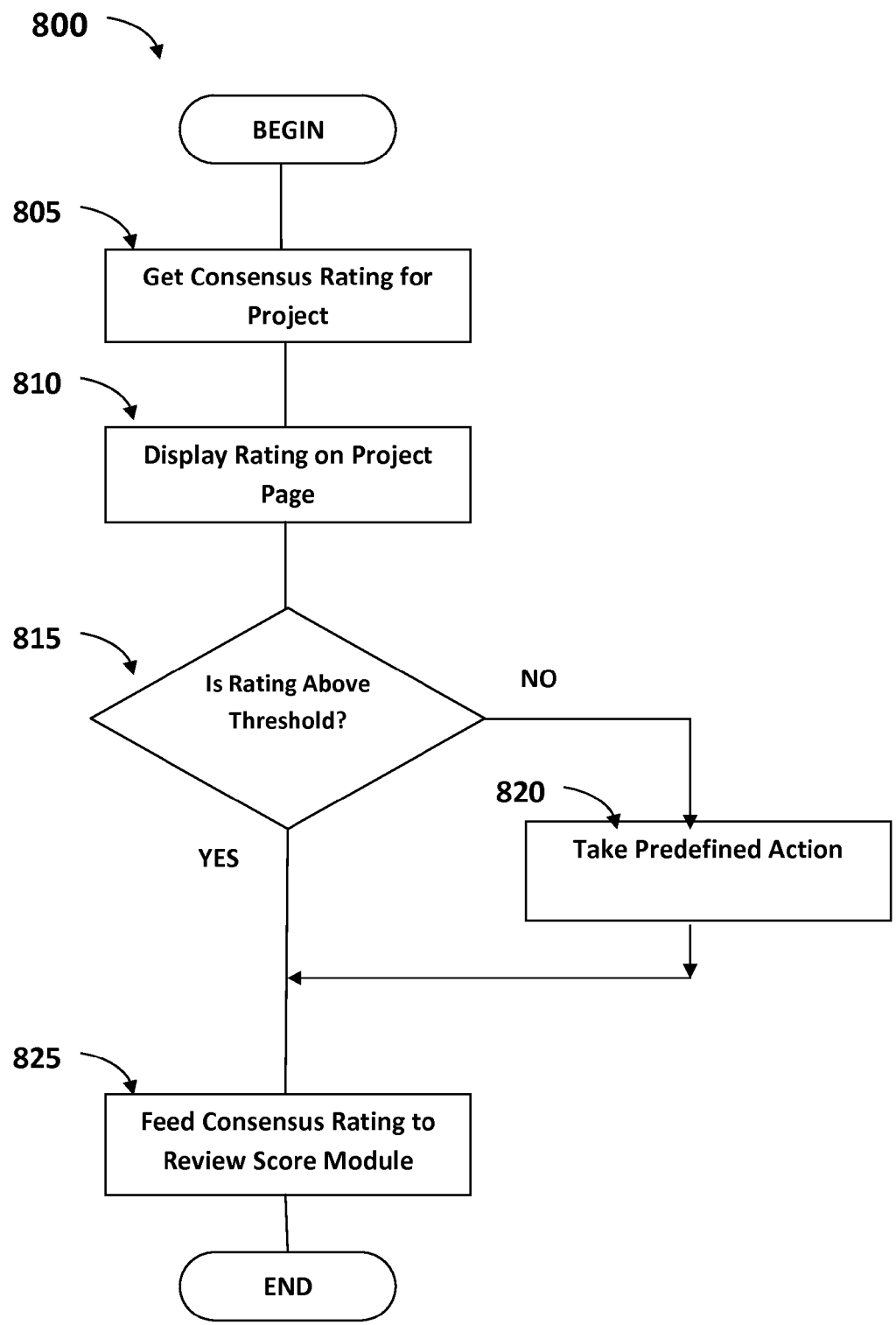
FIG. 8 is a flow diagram representing the Presentation module and Action module presented in FIG. 3, 800.

FIG. 8 is a flow diagram illustrating the sequential operations 800 in computer system 300 representing the Presentation module and Action module. The Consensus rating calculated in process 720 is fed to process 805 by process 725. The Consensus Rating is sent by process 810 to the customer either via user display 330 of computer system 300 or by other means such as email. In process 815 the Consensus rating is compared to a quality threshold. If the rating is below the threshold, then process 820 is invoked to perform a predefined action, such as sending the project automatically to be translated again. If the Consensus Rating is above the threshold, then the rating is saved in process 825 to be used later in the Reviewer Score module 900.

Figure 9:
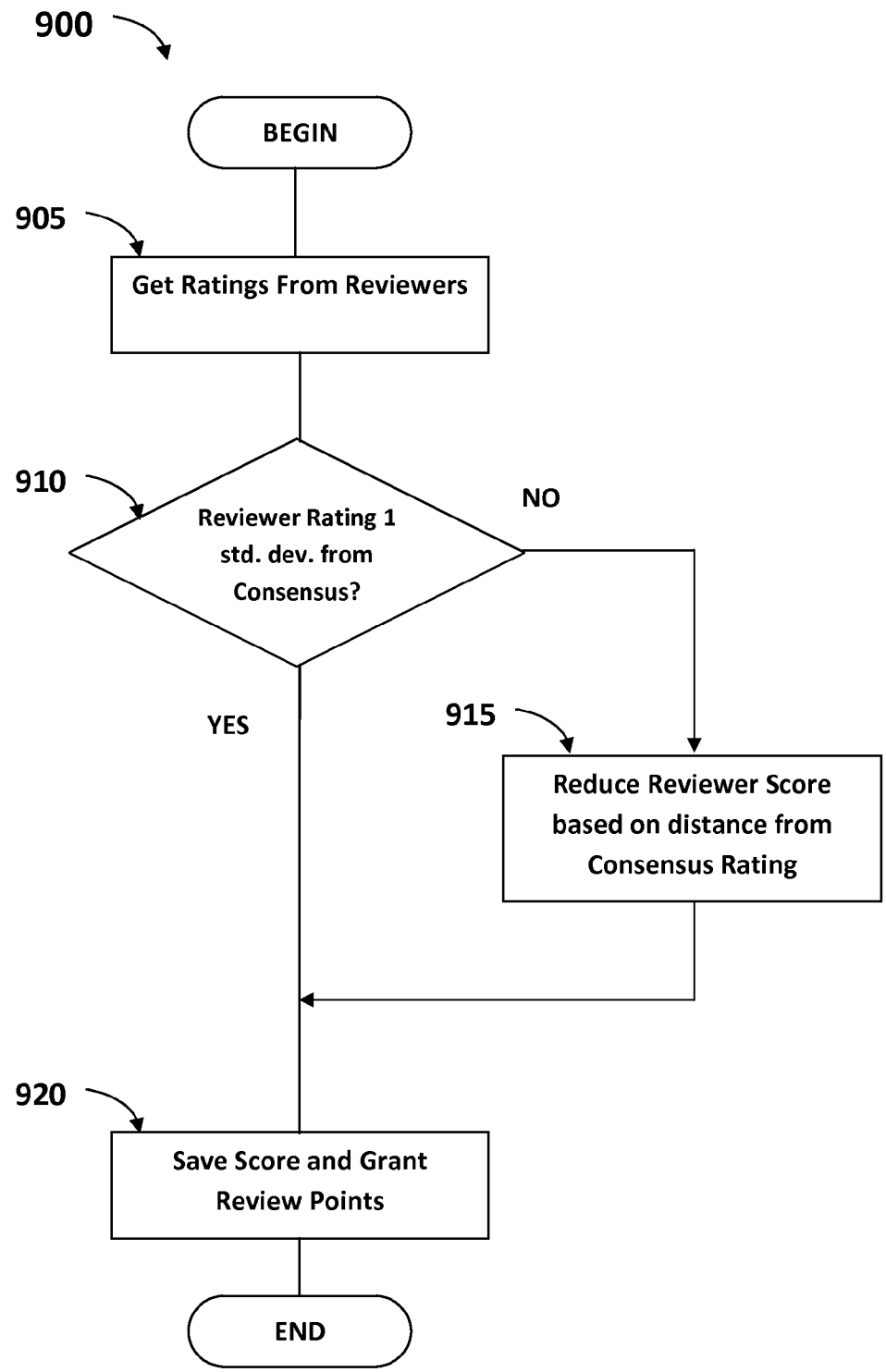
FIG. 9 is a flow diagram representing the calculation of the score for the translator as presented in FIG. 3, 900.

FIG. 9 is a flow diagram illustrating the sequential operations 900 in computer system 300 representing the calculation of the score for the reviewer. The purpose of this process is to get reviewers to provide realistic, fair ratings and to avoid subjectively rating projects. The predetermined amount of points a reviewer gets for a Translation project is adjusted by how close s/he is to the mean rating of the assigned reviewers, excluding statistical outliers. Thus reviewers that consistently give low or high ratings will be awarded less points and subsequently will not be included in future rating projects. Process 905 receives the Consensus rating from process 820. Process 910 checks if the rating given by the reviewer is within 1 standard deviation from the mean ratings If it is, then score is saved for the reviewer by process 920. If it is not, then the score is adjusted based upon its difference from the Consensus rating. The number of Review Points are reduced as a function of the distance from the mean, wherein the bigger the difference between the mean of the ratings and the individual reviewer rating, then the lower the score assigned to the reviewer for a given project.

Given this disclosure alternative equivalent embodiments will become apparent to those skilled in the art. These embodiments are also within the contemplation of the inventors.

What is claimed is:

1. A networked based computing system for a group of professional translator reviewers to evaluate a quality of a language translation of text conducted by a human, comprising:

a) a system computer comprising a processor and a memory device operably connected to one another, and a plurality of computer-executable instructions stored on the memory device and executed by the processor, comprising:
  i) a rating collection module that collects a rating on the quality of said language translation from each of the professional translator reviewers within said group;
  ii) a rating calculation module that calculates a consensus rating of the professional translator reviewers' ratings;
  iii) a presentation and action module that sends the consensus rating to a client computing system and takes corrective action when the consensus rating is below a quality threshold; and,
  iv) a reviewer scoring module that calculates a score for each of said professional translator reviewers; and,
  v) a database storing said professional translator reviewers' profiles and credentials;
 b) a plurality of computing devices in electronic communication with said system computer; and
 c) a client computing system in communication with said system computer to send a request for an evaluation, and to receive said consensus rating on a designated translation project.

2. The system of claim 1, wherein each of the plurality of computing devices comprises:
 a) a system computer comprising a processor and a memory device operably connected to one another, and a plurality of computer-executable instructions stored on said memory device and executed by said processor, comprising:
  i) a rating and feedback collection module to alert the professional translator reviewer that a new project is available for evaluation, and for the reviewer to return the translation's quality rating to said system computer; and
  ii) a presentation module to simultaneously view on a graphical interface an original text and a translation text;
 b) a wired or wireless network connection with said system computer.

3. The computer system of claim 1, wherein said rating collection module collects rating from a designated minimal number of the professional translator reviewers within the group in case a time limit is reached.

4. The computer system of claim 1, wherein said rating calculation module calculates the consensus rating selected from the group consisting of: an average, a mean, an average after removing statistical outliers, and any other acceptable mathematical calculation representing the consensus of a majority of the reviewers' evaluations.

5. The computer system of claim 1, wherein said reviewer's score comprises a comparison between the professional translator reviewer's rating for the translation and the group's consensus rating by acceptable mathematical methods.

6. The computer network of claim 5, wherein each of the professional translator reviewers are sent via electronic communications the reviewer's score and feedback for each translation that the reviewer has provided an evaluation of.

7. The computer network of claim 1, wherein said system computer sends requests for rating a quality of a translation, and an original text with its translation to said professional translator reviewers' computing devices.

8. The computer network of claim 1, wherein said professional translator reviewers send an acceptance for an evaluation request and said rating of a translation from their computing device to said system computer.

9. A computer implemented method for a group of professional translator reviewers to evaluate a quality of a language translation of text conducted by a human, comprising:
 a) transmitting a translation evaluation request from a client computing device to a system computer;
 b) under control of a system computer database, identifying a plurality of professional translator reviewers with qualifying credentials;
 c) communicating with said plurality of the professional translator reviewers via wired or wireless electronic communications;
 d) evaluating the quality of the translation by the plurality of professional translator reviewers and each reviewer assigning a quality rating;
 e) calculating a consensus rating by the system computer for a collection of quality ratings from said plurality of professional translator reviewers;
 f) calculating a reviewer score by the system computer based on a comparison of each professional translator reviewer's rating to the consensus rating; and,
 g) forwarding the consensus rating to said client computing device.

10. The method of claim 9, wherein transmitting said request and forwarding said consensus rating between a client computing device and a system computer may be by wireless or wired communications.

11. The method of claim 9, wherein communicating with said plurality of professional translator reviewers further comprises said computer system notifying preselected reviewers of a new request, and reviewers accepting the new request within a specified time period.

12. The method of claim 11, further comprising forwarding both an original text and a translation to said professional translator reviewers that accepted the request within a specified time period.

13. The method of claim 9, wherein said assigning of a rating comprises a professional translator reviewer providing a numerical value for said translation and may further comprise written comments.

14. The method of claim 9, wherein said calculating the consensus rating comprises calculations selected from the group consisting of: an average, a mean, an average after removing statistical outliers, and any other acceptable mathematical calculation representing the consensus of a majority of the reviewers' evaluations.

15. The method of claim 9, further comprising an automatic ordering of a replacement translation if said consensus rating is less than a designated quality threshold.

16. The method of claim 9, wherein said reviewer score is used in selecting reviewers for subsequent translation evaluation requests.

17. A computer system comprising a processor and a memory device operably connected to one another, and a plurality of computer-executable instructions stored on said memory device and executed by said processor, comprising:
 a) a rating collection module that collects a rating on a quality of a human translation of text from each member of a group of professional translator reviewers;
 b) a rating calculation module that calculates a consensus rating of said group's ratings;
 c) a presentation and action module that sends the consensus rating to a client computing system and automatically orders a new translation when the consensus rating is below a quality threshold; and, d) a reviewer scoring module that calculates a score for each reviewer within said group based on a comparison of each reviewer's quality rating and the group's consensus rating.

18. The system of claim 17, further comprising a database of reviewers' profiles and credentials.

19. The system of claim 17, wherein said rating calculation module calculates the consensus rating selected from the group consisting of: an average, a mean, an average after removing statistical outliers, and any other acceptable mathematical calculation representing the consensus of a majority of the reviewers' evaluations.

* * * * *